United States Patent
Kim et al.

(10) Patent No.: US 9,058,396 B2
(45) Date of Patent: *Jun. 16, 2015

(54) RULES FOR NAVIGATING TO NEXT CONTENT IN A BROWSER

(71) Applicant: Microsoft Corporation, Redmond, WA (US)

(72) Inventors: Jane T. Kim, Seattle, WA (US); John B. Bravenec, Seattle, WA (US); Anthony T. Chor, Bellevue, WA (US); Yi Lang Mok, Bellevue, WA (US); Habtamu M Feyessa, Bothel, WA (US); Sarah J. Bowers, Snohomish, WA (US); Warren G. Stevens, Redmond, WA (US); Robert J. Mauceri, Jr., Seattle, WA (US); Michael J. Patten, Sammamish, WA (US); Aaron M. Butcher, Redmond, WA (US); Vikas Rajvanshy, Clyde Hill, WA (US); Jaime Martin Sanchez Lopez, Redmond, WA (US); Mark H. Schmidt, Sammamish, WA (US); David B. Flink, Carnation, WA (US); Yan Ke, Redmond, WA (US); Louis A. Martinez, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/653,294

(22) Filed: Oct. 16, 2012

(65) Prior Publication Data

US 2013/0305159 A1 Nov. 14, 2013

Related U.S. Application Data

(63) Continuation of application No. 13/558,704, filed on Jul. 26, 2012, now Pat. No. 8,977,967.

(60) Provisional application No. 61/646,147, filed on May 11, 2012.

(51) Int. Cl.
G06F 3/048 (2013.01)
G06F 17/30 (2006.01)

(52) U.S. Cl.
CPC .... G06F 17/30873 (2013.01); G06F 17/30876 (2013.01)

(58) Field of Classification Search
CPC .................. G06F 17/30873; G06F 17/30876
See application file for complete search history.

(56) References Cited

U.S. PATENT DOCUMENTS 7,864,163 B2  1/2011 Ording et al.
8,169,410 B2  5/2012 Hashimoto et al.
(Continued)

FOREIGN PATENT DOCUMENTS

WO  WO-2010144201  12/2010

OTHER PUBLICATIONS

Gray, Joel "Steel Android Web Browser", Retrieved from: <http://www.androidtapp.com/steel-android-web-browser/> on Jul. 12, 2012,(May 2, 2009),6 pages.

"Features on Android", Retrieved from: <http://dolphin-browser.com/features/> on Jul. 12, 2012, 4 pages.

"Non-Final Office Action", U.S. Appl. No. 13/558,704, (Jan. 17, 2013), 14 pages.

(Continued)

*Primary Examiner* — Scott Baderman
*Assistant Examiner* — Asher Kells
(74) *Attorney, Agent, or Firm* — John Jardine; Kate Drakos; Micky Minhas

(57) ABSTRACT

In one or more embodiments, a flip ahead input, such as a gesture, provides touch users with an ability to easily navigate various websites. The flip ahead input can be utilized to advance to the next portion of relevant content. In at least some embodiments, the flip ahead input resides in the form of a forward swipe. In one or more embodiments, the flip ahead input is configured to be utilized in association with an aggregated browsing history from multiple users. The aggregated browsing history is analyzed to generate rules that are then downloaded to a client device and used by a suitably-configured web browser to ascertain the next portion of content when a flip ahead input is received.

18 Claims, 9 Drawing Sheets

(56) References Cited

U.S. PATENT DOCUMENTS

| | | |
|---|---|---|
| 8,977,967 B2 | 3/2015 | Kim et al. |
| 2006/0059152 A1 | 3/2006 | Nakamura |
| 2006/0069618 A1* | 3/2006 | Milener et al. ............... 705/14 |
| 2006/0085766 A1* | 4/2006 | Dominowska et al. ....... 715/854 |
| 2008/0295018 A1* | 11/2008 | Nurmi et al. ................. 715/780 |
| 2009/0244020 A1 | 10/2009 | Sjolin |
| 2010/0262780 A1 | 10/2010 | Mahan et al. |
| 2010/0332962 A1 | 12/2010 | Hammer et al. |
| 2011/0035663 A1 | 2/2011 | Moon et al. |
| 2012/0005192 A1 | 1/2012 | Bao et al. |
| 2012/0011095 A1 | 1/2012 | Ahrens et al. |
| 2012/0167017 A1* | 6/2012 | Oh ................................ 715/863 |
| 2012/0284597 A1* | 11/2012 | Burkard et al. .............. 715/205 |
| 2013/0305136 A1 | 11/2013 | Kim |

OTHER PUBLICATIONS

"International Search Report", Mailed Date: Jul. 19, 2013, Application No. PCT/US2013/040680, Filed Date: May 11, 2013, pp. 9.

"Final Office Action", U.S. Appl. No. 13/558,704, (Jun. 21, 2013), 20 pages.

"Non-Final Office Action", U.S. Appl. No. 13/558,704, Dec. 20, 2013, 24 pages.

"Final Office Action", U.S. Appl. No. 13/558,704, Jul. 31, 2014, 24 pages.

"Notice of Allowance", U.S. Appl. No. 13/558,704, Oct. 24, 2014, 6 pages.

"Corrected Notice of Allowance", U.S. Appl. No. 13/558,704, Nov. 20, 2014, 2 pages.

* cited by examiner

RULES FOR NAVIGATING TO NEXT CONTENT IN A BROWSER

RELATED APPLICATION

This application is a continuation of and claims priority under 35 U.S.C. §120 to U.S. patent application Ser. No. 13/558,704, filed on Jul. 26, 2012, which claims priority to U.S. Provisional Application Ser. No. 61/646,147, filed on May 11, 2012, the disclosures of which are incorporated by reference herein.

BACKGROUND

Web browsing on devices, such as touch devices and others, can frustrate users because a large number of websites are not optimized for certain types of input, such as touch input. Further, challenges continue to be presented to web browser designers to make the user experience enjoyable and efficient across various form factor devices.

SUMMARY

This Summary is provided to introduce a selection of concepts in a simplified form that are further described below in the Detailed Description. This Summary is not intended to identify key features or essential features of the claimed subject matter.

In one or more embodiments, a flip ahead input, such as a flip ahead gesture, provides users, such as touch users and others, with an ability to easily navigate various websites. The flip ahead input can be utilized to advance to the next portion of relevant content. In at least some embodiments, the flip ahead input resides in the form of a forward swipe.

In one or more embodiments, the flip ahead input is configured to be utilized in association with an aggregated browsing history from multiple users. The aggregated browsing history is analyzed to generate rules that are then downloaded to a client device and used by a suitably-configured web browser to ascertain the next portion of content when a flip ahead input is received.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
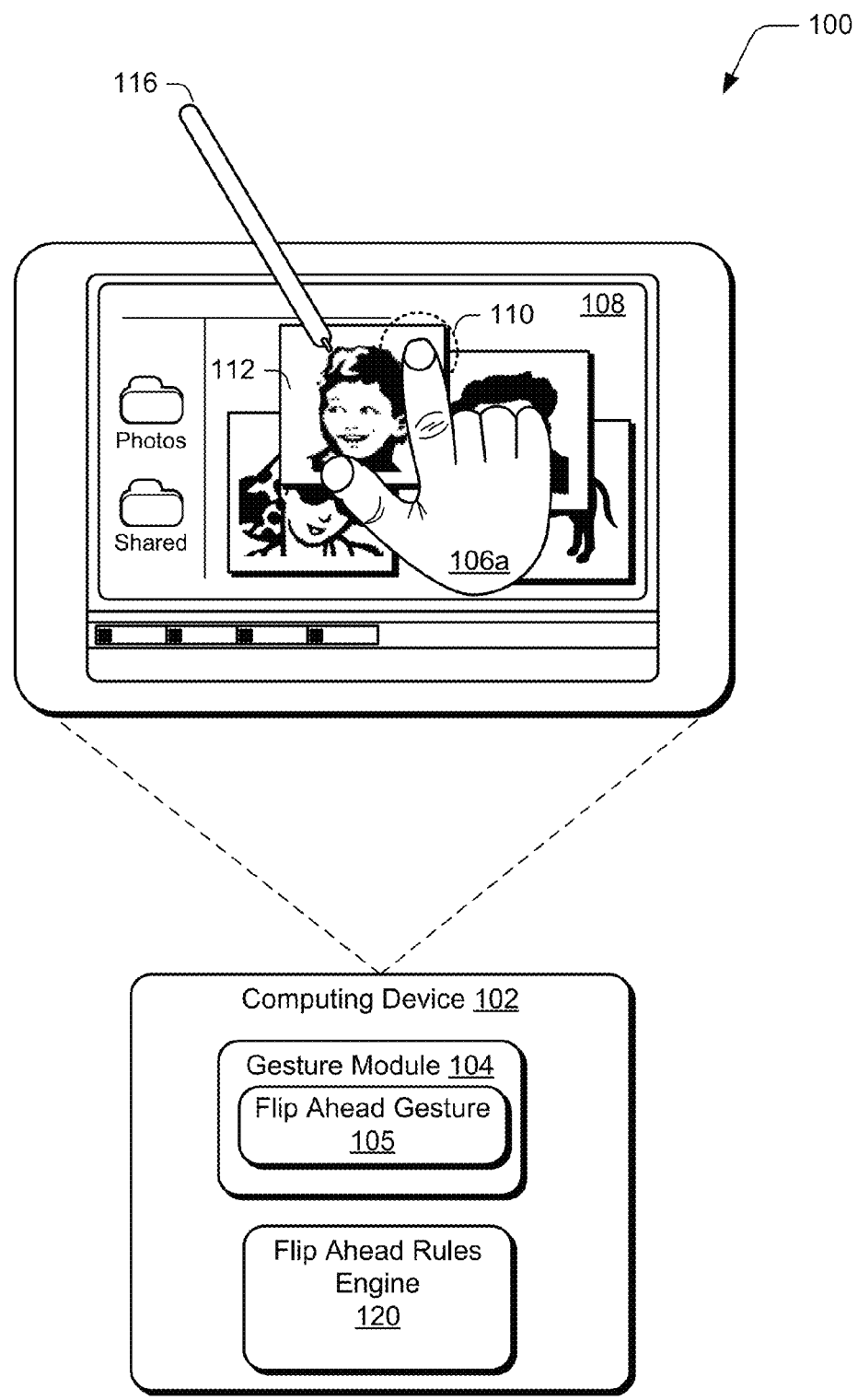
FIG. 1 is an illustration of an environment in an example implementation in accordance with one or more embodiments.

In one or more embodiments, a flip ahead input, such as a gesture, provides users, such as touch users and others, with an ability to easily navigate various websites. The flip ahead input can be utilized to advance to the next portion of relevant content. In at least some embodiments, the flip ahead input resides in the form of a forward swipe, although other gestural forms can be utilized without departing from the spirit and scope of the claimed subject matter. In addition, other forms of input can be utilized to implement flip ahead functionality. Such other forms of input can include, by way of example and not limitation, clicking the forward button on a web browser, clicking the forward web the transport control of a web browser, using various natural user interface (NUI) gestures, and the like. In one or more embodiments, the flip ahead input comprises input that is received independent of a displayed navigation instrumentality of a web browser.

In one or more embodiments, the flip ahead input is configured to be utilized in association with an aggregated browsing history from multiple users. The aggregated browsing history is analyzed to generate rules that are then downloaded to a client device and used by a suitably-configured web browser to ascertain the next portion of content when a flip ahead input is received. Content portions can include any suitable type of content such as, by way of example and not limitation, sequentially accessible content that may have a natural ordering, such as paginated content like ordered pages that would appear in an article, slides in a slide show, video content and the like.

In at least some embodiments, the techniques that are employed to enable flip ahead functionality utilize a webpage's Document Object Model (DOM) elements for an analysis to ascertain the next page or portion of relevant content. This constitutes a departure from considering only the text or links on a particular webpage to determine the next page or portion of relevant content. Analyzing the DOM elements, in view of an aggregated user browsing history across multiple users, as described below, can increase the accuracy and precision with which the next content is selected as compared to simply examining each link on a page. This is because individual domains frequently use different conventions for indicating the link to the next portion of content, such as a page of an article or a slide of a slideshow. The techniques associated with the flip ahead functionality specify the DOM element for the next content for each covered domain. This can mitigate effects associated with selecting a wrong link. For example, two links on the page may each have anchor text containing the word "next", thus creating an ambiguity as to which content is to be the next content.

In at least some embodiments, a webpage's DOM structure is utilized as a heuristic to identify content on the page that may likely be relevant to various users. In at least one approach, a "heat map" of DOM elements on a page is built as a function of the frequency with which users make selections. While this is less specific than identifying individual links that are frequently clicked, the page DOM structure changes far less frequently than page links. Accordingly, selecting from a number of links or content references within "hotter" DOM elements is likely indicative of content that is of interest to users. Essentially, then, how users interact with the structure of a webpage, instead of how they interact with individual links on a page, becomes a strong hint of relevance.

Accordingly, the various embodiments described herein employ one or more algorithms to intelligently determine and select a destination to which to advance, as a function of user interaction across multiple users, when a flip ahead gesture is received.

In the following discussion, an example environment is first described that is operable to employ the techniques described herein. Example illustrations of the user input, e.g., gestures and procedures, are then described, which may be employed in the example environment, as well as in other environments. Accordingly, the example environment is not limited to performing the example gestures and the gestures are not limited to implementation in the example environment.

Example Environment

FIG. 1 is an illustration of an environment 100 in an example implementation that is operable to employ the techniques described herein. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 also includes software that causes the computing device 102 to perform one or more operations as described below.

Computing device 102 includes a gesture module 104 including a flip ahead gesture module 105 that forms part of the gesture module 104. The gesture modules can be implemented in connection with any suitable type of hardware, software, firmware or combination thereof. In at least some embodiments, the gesture modules are implemented in software that resides on some type of tangible, computer-readable medium, examples of which are provided below.

Gesture module 104 and flip ahead module 105 represent functionality that recognizes gestures and causes operations to be performed that correspond to the gestures. The gestures may be recognized by modules 104, 105 in a variety of different ways. For example, the gesture module 104 may be configured to recognize a touch input, such as a finger of a user's hand 106a as proximal to or touching display device 108 of the computing device 102 using touchscreen or near field functionality. In addition, flip ahead gesture module 105 can be configured to recognize a flip ahead touch input, such as a finger of a user's hand 106b, that initiates the gesture.

In the illustrated example, a finger of the user's hand 106a is illustrated as selecting 110 an image 112 displayed by the display device 108. Selection 110 of the image 112 and subsequent movement of the finger of the user's hand 106a may be recognized by the gesture module 104. The gesture module 104 may then identify this recognized movement as indicating a "drag and drop" operation to change a location of the image 112 to a point in the display at which the finger of the user's hand 106a was lifted away from the display device 108. Thus, recognition of the touch input that describes selection of the image, movement of the selection point to another location, and then lifting of the finger of the user's hand 106a may be used to identify a gesture (e.g., drag-and-drop gesture) that is to initiate the drag-and-drop operation.

A variety of different types of gestures may be recognized by the gesture modules 104, 105 such as gestures that are recognized from a single type of input (e.g., touch gestures such as the previously described drag-and-drop gesture, forward swipe gestures, and the like) as well as gestures involving multiple types of inputs. For example, modules 104, 105 can be utilized to recognize single-finger gestures and bezel gestures, multiple-finger/same-hand gestures and bezel gestures, and/or multiple-finger/different-hand gestures and bezel gestures.

For example, the computing device 102 may be configured to detect and differentiate between a touch input (e.g., provided by one or more fingers of the user's hand 106a) and a stylus input (e.g., provided by a stylus 116). The differentiation may be performed in a variety of ways, such as by detecting an amount of the display device 108 that is contacted by the finger of the user's hand 106 versus an amount of the display device 108 that is contacted by the stylus 116.

Thus, the gesture modules 104, 105 may support a variety of different gesture techniques through recognition and leverage of a division between stylus and touch inputs, as well as different types of touch inputs. Accordingly, the gesture modules 104, 105 may support a variety of different gestures.

In addition, the computing device 102 includes a flip ahead rules engine 120. In one or more embodiments, the flip ahead rules engine 120 receives rules in the form of rules files from one or more servers, and processes the rules to store them on the client device. The rules are later used during a user's navigation activities to select a next piece of content responsive to receiving input in the form of a flip ahead gesture. Examples of various types of rules are provided below.

Figure 2:
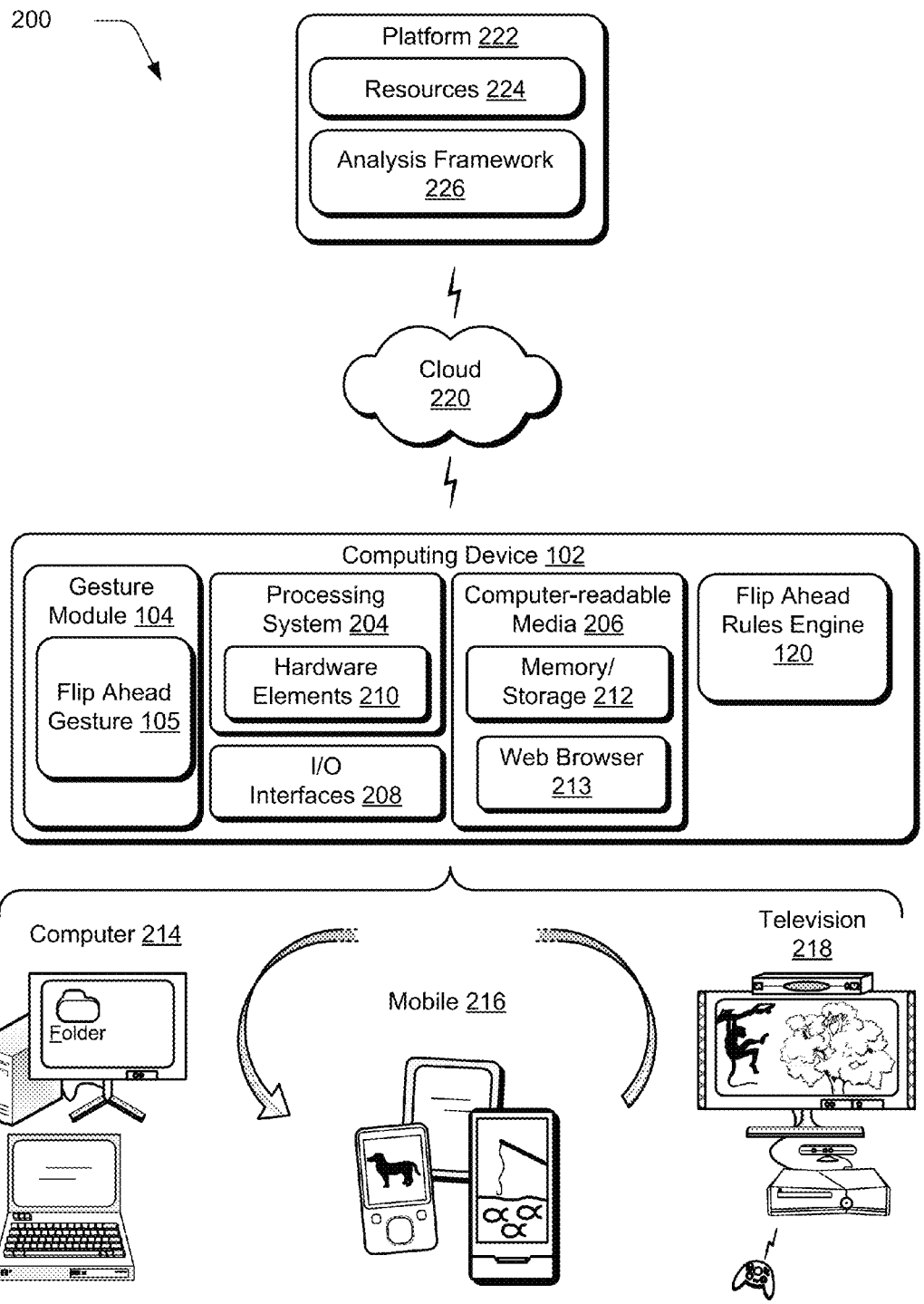
FIG. 2 is an illustration of a system in an example implementation showing FIG. 1 in greater detail.

FIG. 2 illustrates an example system generally at 200 that includes an example computing device 102 that is representative of one or more computing systems and/or devices that may implement the various techniques described herein. The computing device 102 may be, for example, a server of a service provider, a device associated with a client (e.g., a client device), an on-chip system, and/or any other suitable computing device or computing system. Computing device 102 includes gesture module 104, flip ahead gesture module module 105, and flip ahead rules engine 120, as described above.

The example computing device 102 also includes a processing system 204, one or more computer-readable media 206, and one or more I/O interface 208 that are communicatively coupled, one to another. Although not shown, the computing device 102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 204 is representative of functionality to perform one or more operations using hardware. Accordingly, the processing system 204 is illustrated as including hardware elements 210 that may be configured as processors, functional blocks, and so forth. This may include implementation in hardware as an application specific integrated circuit or other logic device formed using one or more semiconductors. The hardware elements 210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 206 is illustrated as including memory/storage 212. The memory/storage 212 represents memory/storage capacity associated with one or more computer-readable media. The memory/storage component 212 may include volatile media (such as random access memory (RAM)) and/or nonvolatile media (such as read only memory (ROM), Flash memory, optical disks, magnetic disks, and so forth). The memory/storage component 212 may include fixed media (e.g., RAM, ROM, a fixed hard drive, and so on) as well as removable media (e.g., Flash memory, a removable hard drive, an optical disc, and so forth). The computer-readable media 206 may be configured in a variety of other ways as further described below.

Input/output interface(s) 208 are representative of functionality to allow a user to enter commands and information to computing device 202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 102 may be configured in a variety of ways as further described below to support user interaction.

Computing device 102 also includes a web browser 213 that can operate as described above and below, in conjunction with the gesture module 104 and flip ahead rules engine 120.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 210 and computer-readable media 206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 210. The computing device 102 may be configured to implement particular instructions and/or functions corresponding to the software and/or hardware modules. Accordingly, implementation of a module that is executable by the computing device 102 as software may be achieved at least partially in hardware, e.g., through use of computer-readable storage media and/or hardware elements 210 of the processing system 204. The instructions and/or functions may be executable/operable by one or more articles of manufacture (for example, one or more computing devices 102 and/or processing systems 204) to implement techniques, modules, and examples described herein.

As further illustrated in FIG. 2, the example system 200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 200, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 202 may assume a variety of different configurations, such as for computer 214, mobile 216, and television 218. Each of these configurations includes devices that may have generally different constructs and capabilities, and thus the computing device 102 may be configured according to one or more of the different device classes. For instance, the computing device 602 may be implemented as the computer 214 class of a device that includes a personal computer, desktop computer, a multi-screen computer, laptop computer, netbook, and so on.

The computing device 202 may also be implemented as the mobile 216 class of device that includes mobile devices, such as a mobile phone, portable music player, portable gaming device, a tablet computer, a multi-screen computer, and so on. The computing device 202 may also be implemented as the television 218 class of device that includes devices having or connected to generally larger screens in casual viewing environments. These devices include televisions, set-top boxes, gaming consoles, and so on.

The techniques described herein may be supported by these various configurations of the computing device 102 and are not limited to the specific examples of the techniques described herein. This functionality may also be implemented all or in part through use of a distributed system, such as over a "cloud" 220 via a platform 222 as described below.

The cloud 220 includes and/or is representative of a platform 222 for resources 224. The platform 222 abstracts underlying functionality of hardware (e.g., servers) and software resources of the cloud 220. The resources 224 may include applications and/or data that can be utilized while computer processing is executed on servers that are remote from the computing device 102. Resources 224 can also include services, such as web services, provided over the Internet and/or through a subscriber network, such as a cellular or Wi-Fi network.

The platform 222 may abstract resources and functions to connect the computing device 102 with other computing devices. The platform 222 may also serve to abstract scaling of resources to provide a corresponding level of scale to encountered demand for the resources 224 that are implemented via the platform 222. Accordingly, in an interconnected device embodiment, implementation of functionality described herein may be distributed throughout the system 200. For example, the functionality may be implemented in part on the computing device 202 as well as via the platform 222 that abstracts the functionality of the cloud 220.

In one or more embodiments, platform 222 can include an analysis framework 226 that analyzes how users interact with content and from its analysis, produces rules that can be provided to various client devices. The analysis framework 246 collects user data pertaining to user interaction with content and from this user data builds heat maps of webpages within particular domains. For example, analysis can include ascertaining which DOM elements users click on and, based upon the frequency of user interaction, building heat maps of webpages to which users navigate within a particular domain. The heat maps are applied to multiple pages within the domains. The heat maps can then be utilized to produce rules which, in turn, can drive the selection of the next piece of relevant content to expose to a user when a flip ahead gesture is received, as will become apparent below.

In the discussion that follows, various sections describe example embodiments. A section entitled "Example Analysis Framework" describes an analysis framework in accordance with one or more embodiments. Next, a section entitled "General Rules and Specific Rules" describes examples of general rules and specific rules in accordance with one or more embodiments. Following this, a section entitled "Rule Application in a Browsing Context" describes how rules can be applied in a browsing context in accordance with one or more embodiments. Next, a section entitled "Pre-Fetching and Pre-Rendering Content" describes how content can be pre-fetched and pre-rendered in accordance with one or more embodiments. Next, a section entitled "Implementation Example" describes an implementation example in accordance with one or more embodiments. Last, a section entitled "Example Device" describes an example device that can be utilized to implement one or more embodiments.

Example Analysis Framework

Figure 3:
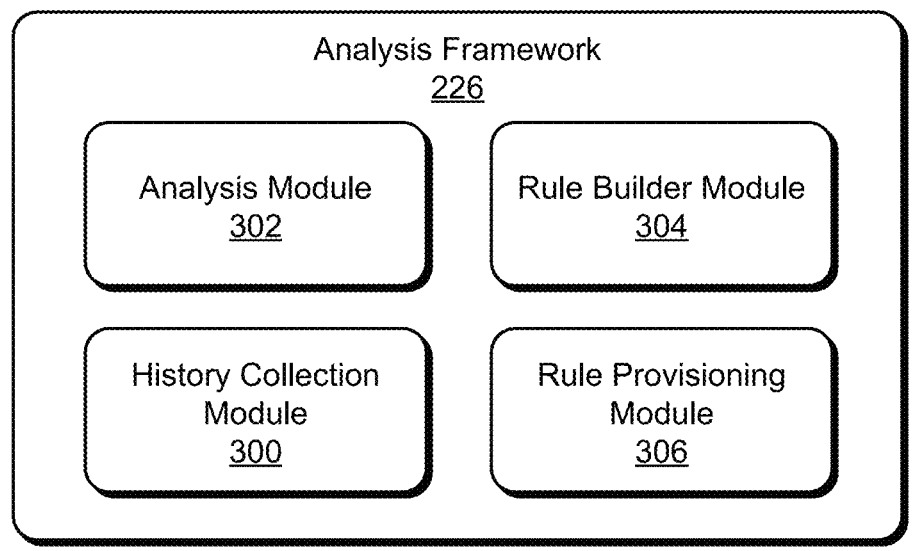
FIG. 3 illustrates an example analysis framework in accordance with one or more embodiments.
Figure 3:
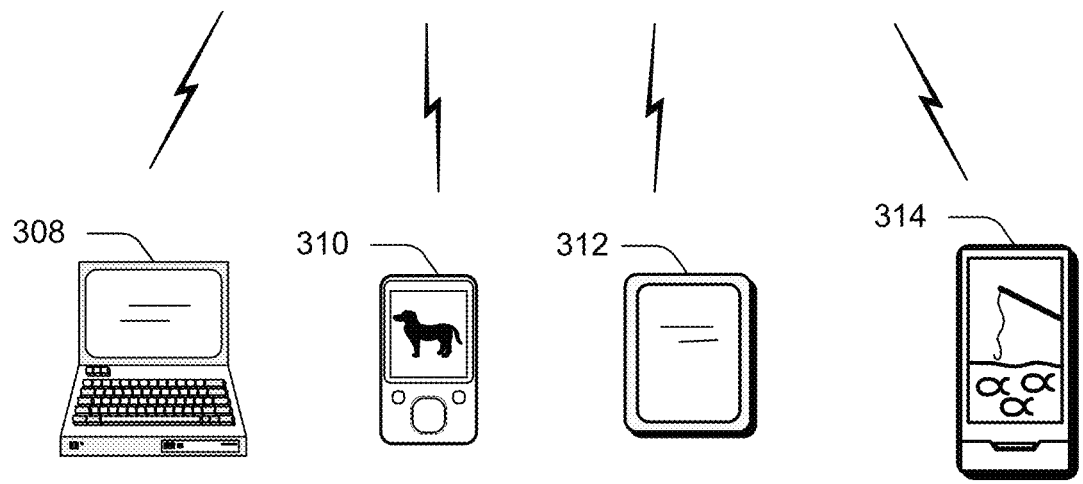

FIG. 3 illustrates an example analysis framework 226 in accordance with one or more embodiments. In the illustrated and described example, analysis framework 226 includes a history collection module 300, an analysis module 302, a rule builder module 304, and a rule provisioning module 306. The analysis framework can be implemented in any suitable hardware, software, firmware or combination thereof.

In one or more embodiments, users can opt into a service through which their browsing history can be analyzed for the purpose of developing rules that can be further provided to multiple other users. For example, the users of each of client devices 308, 310, 312, and 314 can opt into the service through which their browsing history can be collected and analyzed by the analysis framework 226.

History collection module 300 collects user information associated with a user's browsing history. Module 300 collects information including browsed sites and user interaction patterns within a particular site domain. Once collected, analysis module 302 analyzes the collected user information to ascertain how the various users have interacted with individual domains. For example, the analysis module can analyze the links that are clicked within a particular domain, how frequently the links are clicked, and other relational aspects of the user's interaction such as paths taken through a website's content.

Rule builder module 304 uses analysis information to develop heat maps for multiple pages within individual domains. The heat maps are developed for DOM elements within the individual domains and provide an indication of those DOM elements that are more frequently browsed to than others. The heat maps can then be utilized by the rule builder module 304 to formulate rules associated with particular domains. For example, the rules can define that for a particular webpage that might be currently displayed for user, a next webpage would be one associated a hot DOM element that was frequently browsed to from the currently displayed webpage by users of devices 308, 310, 312, and 314.

Once the rules have been built for the individual domains they can be provided to the various client devices for use in ascertaining a flip ahead next page when a flip ahead input is received.

Figure 4:
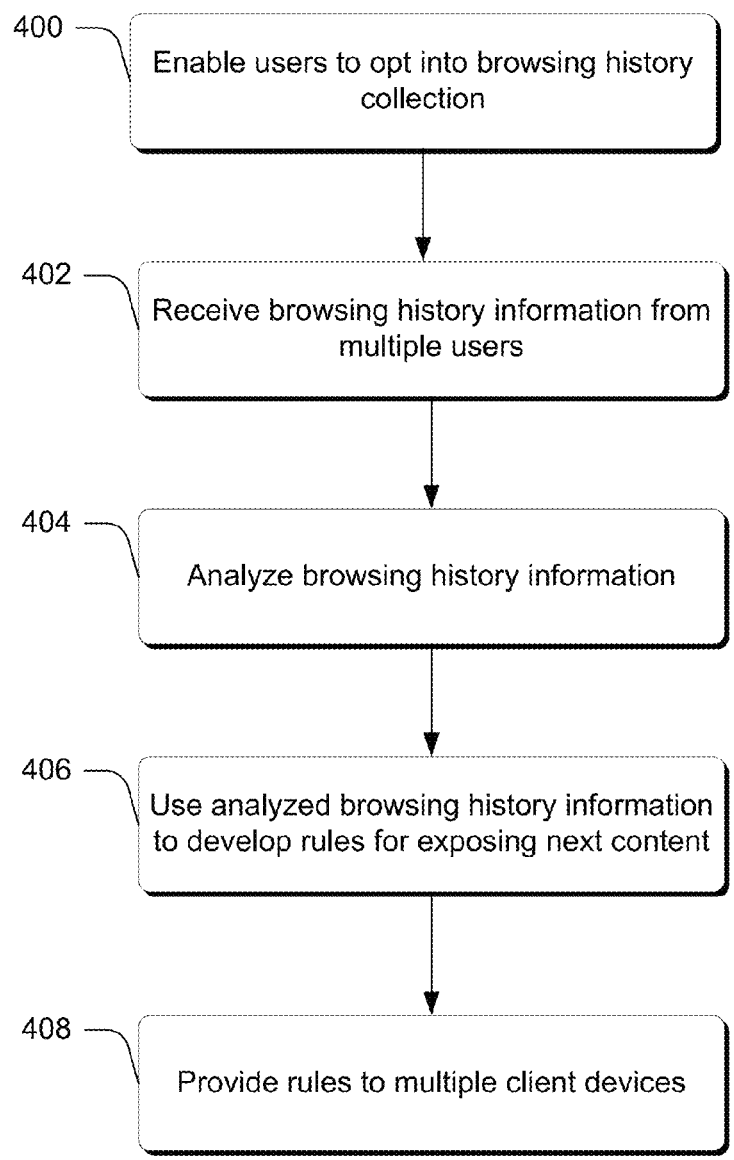
FIG. 4 is a flow diagram that describes the steps in a method in accordance with one or more embodiments.

FIG. 4 is a flow diagram that describes steps in a method in accordance with one or more embodiments. The method can be implemented in connection with any suitable hardware, software, firmware, or combination thereof. In at least some embodiments, the method is implemented by a suitably-configured analysis framework module, such as the one described above.

Step 400 enables users to opt into browsing history collection. This step can be performed in any suitable way such as, by way of example and not limitation, causing presentation of a dialogue in a user's web browser that presents them with an option to allow their browsing history to be collected. Step 402 receives browsing history information from multiple users. The step can be performed in any suitable way. For example, as a user browses content with their web browser, their browsing activities can be conveyed to a suitably-configured server for collection. Step 404 analyzes the browsing history information. This step can be performed in any suitable way including, by way of example and not limitation, looking for browsing patterns and using the browsing patterns to build a heat map associated with content to which a user has browsed. Step 406 uses the analyzed browsing history information to develop rules for exposing "next" content. For example, this step can be performed by using the develop heat maps to set up associations between DOM elements. For example, if a large number of users typically browse from DOM_element_1 within a domain to DOM_element_2 within the particular domain, then a rule can be developed that associates DOM_element_2 as the DOM element to use when selecting the next content when a user is currently consuming content within DOM_element_1.

Step 408 provides the developed rules to multiple client devices. This step can be performed in any suitable way such as, by way of example and not limitation, using push or pull models.

Having discussed how rules can be formulated and provisioned, consider now a discussion of various types of rules and how they can be employed in the context of various embodiments.

General Rules and Specific Rules

In the illustrated and described embodiment, multiple different types of rules can be utilized in order to determine the next content, e.g. the next webpage, media object, slide, and the like, to present to a user when a flip ahead input, such as a flip ahead gesture, is received. In at least some embodiments, rules can include both general rules and specific rules.

General rules can be thought of as rules that are globally applicable across multiple domains. For example, when a webpage is parsed, it can include various instrumentalities that enable users to access a next sequential piece of content. As an example, a webpage may include a link entitled "Next Page", or a non-textual instrumentality in the form of an arrow or some other type of icon which, when selected, will enable a user to navigate to a next piece of content. General rules can be developed such that when one of these instrumentalities is observed within a webpage, the next content to be exposed responsive to a flip ahead input is the corresponding piece of content that can be accessed by selecting the instrumentality. In one or more embodiments, at least some general rules can be expressed as text tokens that can be localized into various markets. For example, general rules can be localized by being written in the language of a particular market or to appreciate browsing nuances that may vary from market to market based upon different cultural considerations. For example, in cultures that read from right to left, the various instrumentalities may differ as a function of right to left reading. For example, a backward arrow may actually navigate forward.

General rules, as noted above, can be very useful for a large number of domains or situations. Yet, there are situations where general rules may not necessarily provide an unambiguous user experience. For example, a webpage may include multiple different instrumentalities that can be utilized to navigate to different content from the same location. In these and other instances, where the choice for the next content is not clear, specific rules can be utilized to disambiguate the choice for the next content when a flip ahead input is received.

Specific rules can be developed to be domain specific. Specific rules, as noted above, can be expressed in terms of DOM elements that appear within a specific webpage or domain. Specific rules are developed for individual domains based upon the collection and analysis of the browsing patterns of multiple users as noted above. These rules define which DOM elements in a domain are likely to contain a link to the next piece of content.

Once developed, both the general and specific rules can be made available to a variety of client devices. It is to be appreciated and understood that both the general and specific rules can change over time and, in this sense, constitute dynamically changeable rules. These dynamically changeable rules can be periodically provided to the client devices so that their associated rules databases can be updated. Specifically, consider the situation in which users' browsing patterns change over time. For example, current market or world conditions may change in a manner in which, collectively, users' browsing patterns change with respect to content consumption patterns. By enabling both the general and specific rules to be dynamically updated, content that is selected as the "next" content, by virtue of application of the rules at the client device, can be made in a timely, relevant way.

Other specific rules can be defined by a website owner. Specifically, a webpage may include site owner-specified markup that indicates that the owner has already chosen content that is intended to be the next in the sequence of content. For example, the markup may include the use of a link rel="next" meta-tag that expresses the next piece of content in the sequence of content.

Having considered various types of rules, consider now a discussion of how these rules can be employed in a browsing context.

Rule Application in a Browsing Context

In a typical scenario, an individual user will access a webpage through the use of their web browser and begin to interact with the webpage by, for example, clicking on a particular DOM element. When this occurs, a flip ahead rules engine, such as flip ahead rules engine 120 (FIGS. 1 and 2) ascertains whether there is any site owner-specified markup on the webpage that indicates that a website owner has already chosen content that is intended to be next in the sequence of consumable content. For example, as noted above, the webpage may include a link meta-tag that indicates owner-specified next content. If such owner-specified markup is present, the content specified by the owner is honored and, when a flip ahead input is received, the owner-specified content is presented as the next content. If there is no owner-specified content, the flip ahead rules engine looks to see whether there are any domain specific rules, e.g. a next page rule or a next article rule, that have been previously provided to the client device. This can be done in any suitable way. For example, in at least some embodiments, the flip ahead rules engine looks up the current domain in a client cache to determine whether any domain-specific rules for the next content, e.g., next page or article, exists. If there is a domain specific rule, the flip ahead rules engine locates the DOM element corresponding to the DOM element specified in the rules. Typically, this DOM element will contain multiple links to additional webpages within the same domain. The flip ahead rules engine then selects the first unread link in the DOM element on a webpage specified by the rule for the current domain, and sets this link as the flip ahead page. Typically, this can be done by inserting the page as a forward page in the web browser's travel log. Subsequent forward navigation from the current page such as, by way of example and not limitation, receiving a flip ahead gesture or other input, results in the browser navigating to the flip ahead page.

For example, assume that a user is browsing the New York Times website and is reading a paginated article containing five pages of content. Assume also that there are specific rules designating the next page of the current article and the next article. When a flip ahead gesture is received with respect to the current article, the next page as specified by the rule can be presented to the user. When the user reaches the end of the article, by virtue of the fact that the specific rules designate a next article, when a flip ahead gesture is received, the first page of the next article can be presented to the user. This can allow the user to continue reading content across a site that honors pagination and, once there is no more pagination (e.g., reaching the end of the current article), the rules cause presentation of the next new article. Thus, the natural ordering of sequential content, such as pages of an article, is preserved and order as between different articles can be imposed by the rules.

It is to be appreciated and understood, that the rules can be defined for content other than articles such as, by way of example and not limitation, slides, pictures, video and/or any other kind of content that can be expressed in a sequence or become part of an imposed sequence by operation of the rules.

If there is neither site owner-specified markup nor a domain-specific rule for the current webpage, the flip ahead rules engine parses the anchor text for all links on the current page, attempting to locate tokens specified in the rules file that are applicable to the user's language settings. If found, the link associated with the first token that is matched becomes the flip ahead page. If there is no match, then there is no flip ahead page that is set for the next content.

Figure 5:
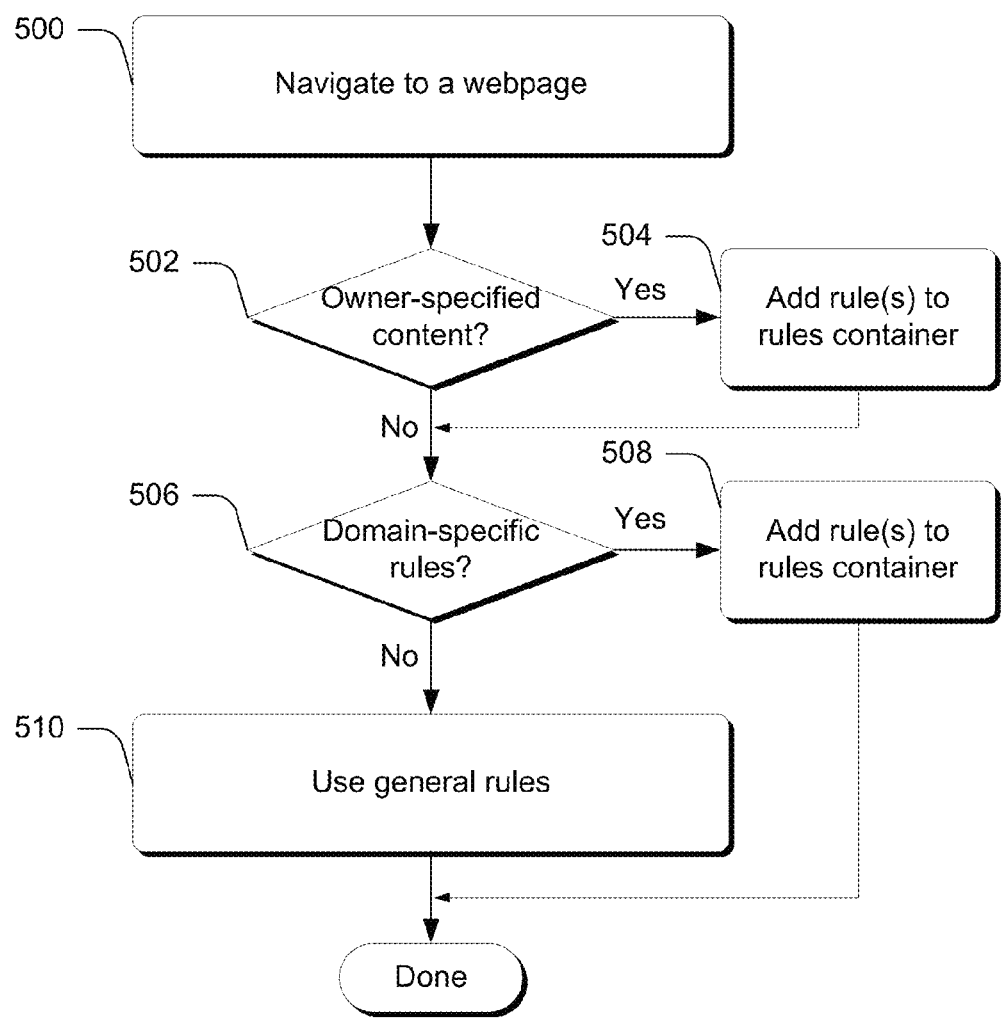
FIG. 5 is a flow diagram that describes the steps in a method in accordance with one or more embodiments.

FIG. 5 is a flow diagram that describes steps in a method in accordance with one or more embodiments. The method can be implemented in connection with any suitable hardware, software, firmware, or combination thereof. In at least some embodiments, the method can be implemented by a suitably-configured web browser and flip ahead rules engine.

Step 500 navigates to a webpage. The step can be performed in any suitable way such as, by way of example and not limitation, receiving user input by way of a web browser. Step 502 ascertains whether the webpage includes any owner-specified content. This step can be performed in any suitable way such as, by way of example and not limitation, parsing a particular webpage and looking for owner-specified content that appears in markup. If owner-specified content is found, step 504 adds the associated rule to a rules container. If there is no owner-specified content or after owner-specified content rules have been added to the rules container, step 506 ascertains whether there are any domain-specific rules. Examples of how this can be done are provided above. If there are domain-specific rules, step 508 adds the domain-specific rules to the rules container. If, on the other hand, there are no domain-specific rules step 510 uses general rules, such as those described above, and adds the general rules to the rules container. At this point, the process of building a rule container for a particular webpage is concluded. Once the rules for particular webpage are built, the rules can be employed for presenting the next content when a flip ahead gesture or other flip ahead input is received.

In operation, the flip ahead functionality utilizes token and domain-specific rule generation in an automated, continuously refined manner. Rules can be continuously updated on various users' computers by downloading rules files at defined intervals. As noted, processing of various webpages for the next piece of sequential content or for relevant content links is performed by analyzing a page's DOM elements. Accordingly, this approach goes beyond simply examining only the anchor text of links. Rules can be customized for individual domains instead of relying on rules that are intended to cover many domains. The use of the domain-specific rules can improve the manner in which the next sequential content is found. This is so because in some instances, a generalized approach may frequently miss opportunities to find this sequential content because text type matching rules are typically pared down to the most commonly used and are typically subject to false positives. Thus, the approach described above presents a more precise and comprehensive approach.

Further, the above-described approach goes beyond simply relying on recommending content based on website and link taxonomy, which can be an imperfect process leading to unexpected and jarring recommendations. The flip ahead logic instead collects user browser history associated with page structure information (i.e. DOM elements) and uses this history to determine the area on webpages within a domain that are freely chosen by other viewers of the same page. The flip ahead logic can be said to choose a recommended area on a page instead of recommended links. Because this logic uses this recommended area, it is not necessary to classify each and every link that appears on the recommended area, so that the flip ahead logic can use the same area of the page to choose content for a user regardless of how frequently the links within this area of the page change.

Having built a suitably-configured rules container for a particular webpage, consider now a discussion of how the rules container can be utilized during a user's interaction with the webpage.

Figure 6:
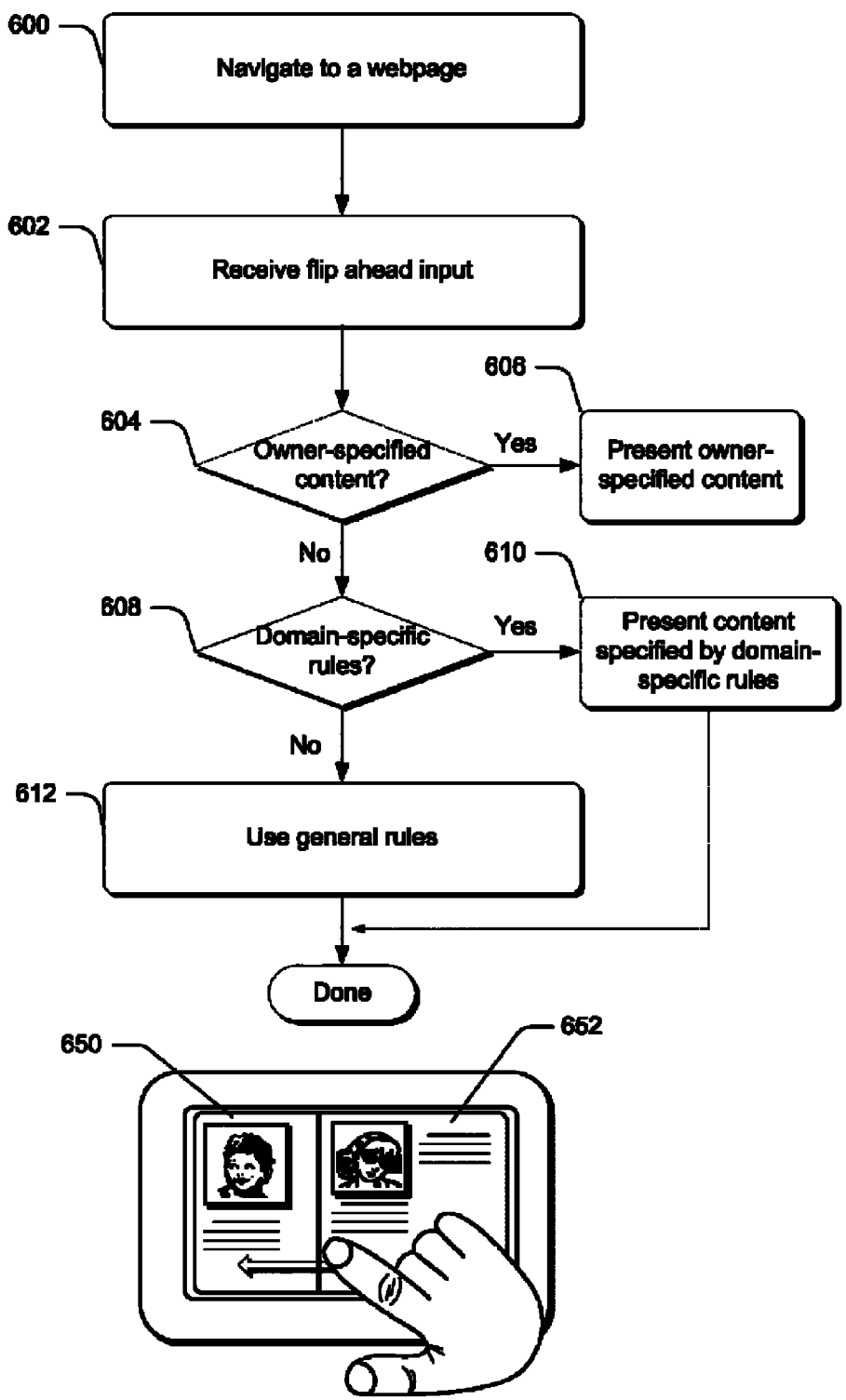
FIG. 6 is a flow diagram that describes the steps in a method in accordance with one or more embodiments.

FIG. 6 is a flow diagram that describes steps in a method in accordance with one or more embodiments. The method can be implemented in connection with any suitable hardware, software, firmware, or combination thereof. In at least some embodiments, the method can be implemented by a suitably-configured web browser and flip ahead rules engine.

Step 600 navigates to a webpage. Step 602 receives a flip ahead input. This input can be received in any suitable way. In at least some embodiments, the flip ahead input can comprise a touch gesture, as indicated in the tablet computing device shown just below the flow diagram. In this particular example, the touch gesture comprises a forward swipe gesture in the direction of the arrow. Other flip ahead input can be received, however, without departing from the spirit and scope of the claimed subject matter. For example, such input can be received in the form of mouse, stylus, natural user interface input and the like. Step 604 ascertains whether there is any owner-specified content associated with the content being currently consumed. In the tablet computing device example, the content that is currently being consumed is shown at 650. If, responsive to determining that owner-specified content exists, step 606 presents the owner specified content. In this example, the owner specified content might be represented by content 652 which slides in from the right. If, on other hand, there is no owner-specified content, step 608 ascertains whether there are any domain-specific rules associated the content being currently consumed. Examples of domain specific rules are provided above. If there are domain-specific rules associated with the currently consumed content, step 610 presents content specified by the domain-specific rules. If, on the other hand, there are no domain-specific rules, step 612 uses general rules, such as those described above, to present new content responsive to receiving the flip ahead input.

In the example just described, flip ahead functionality was described in the context of being responsive to receiving a flip ahead input. In at least some embodiments, however, flip ahead functionality can be performed in advance of receiving a flip ahead input in a manner that streamlines the user's experience and makes the content acquisition and rendering process more efficient. This can be done by pre-fetching or pre-rendering content, as described just below.

Pre-Fetching and Pre-Rendering Content

With respect to prefetching content in association with flip ahead input, consider the following. When the user navigates to particular content and begins to consume that content, the same or similar rules as described above can be utilized to pre-fetch content that is likely to be the "next" content or the next multiple pieces of content based, in part, on what the user might select next on the page. This can be done without receiving flip ahead input. Rather, the web browser can make an intelligent decision about what content or multiple pieces of content might be next, and pre-fetch the content. Then, when a flip ahead input is received, the rendering time associated with the pre-fetched content can be rendered thus enhancing the user's experience. For example, when on the first page of an article, multiple following pages can be pre-fetched so that the browser does not have to load the content each time a flip ahead gesture is received.

With respect to pre-rendering content in association with flip ahead input, consider the following. When the user navigates to a particular content and begins to consume that content, the same or similar rules as described above can be utilized to pre-fetch content that is likely to be the "next" content or next multiple pieces of content and begin to render the content in a separate process. This can be done without receiving flip ahead input. Rather, the web browser can make an intelligent decision about what content might be next, and pre-fetch and pre-render the content in a separate process. Then, when a flip ahead input is received, a process change is executed and the new content is shown immediately to the user. This can further enhance the user's experience by reducing if not eliminating altogether rendering latencies associated with flip ahead input.

Figure 7:
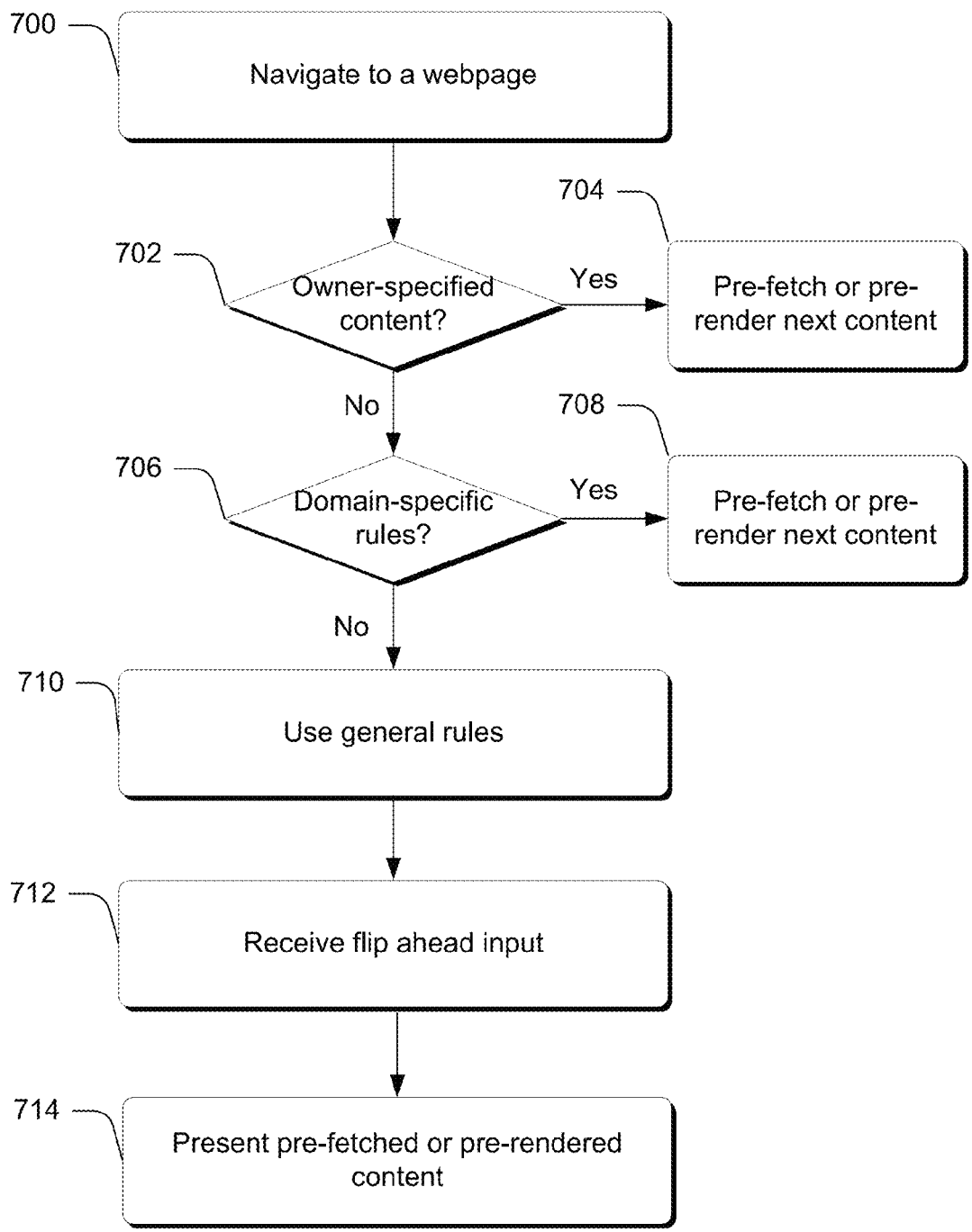
FIG. 7 is a flow diagram that describes the steps in a method in accordance with one or more embodiments.

FIG. 7 is a flow diagram that describes steps in a method in accordance with one or more embodiments. The method can be implemented in connection with any suitable hardware, software, firmware, or combination thereof. In at least some embodiments, the method can be implemented by a suitably-configured web browser and flip ahead rules engine.

Step 700 navigates to a webpage. Step 702 ascertains whether there is any owner-specified content associated with the content being currently consumed. If, responsive to determining that owner-specified content exists, step 704 pre-fetches or pre-renders the next content that is specified by the owner. Examples of how this can be done are provided above. If, on other hand, there is no owner-specified content, step 706 ascertains whether there are any domain-specific rules associated the content being currently consumed. Examples of domain specific rules are provided above. If there are domain-specific rules associated with the currently consumed content, step 708 pre-fetches or pre-renders the next content according to the domain-specific rules. If, on the other hand, there are no domain-specific rules, step 710 uses general rules, such as those described above, to pre-fetch or pre-render the next content.

Step 712 receives a flip ahead input. This input can be received in any suitable way. In at least some embodiments, the flip ahead input can comprise a touch gesture, as in tablet computing and other touch-enabled devices. Other flip ahead input can be received, however, without departing from the spirit and scope of the claimed subject matter. For example, such input can be received in the form of mouse, stylus, natural user interface input and the like. Responsive to receiving the flip ahead input, step 714 presents the pre-fetched or pre-rendering content. If the content has been pre-fetched but not yet rendered, this step can include rendering the pre-fetched content. If, as noted above, the content has been pre-rendered in a separate process, this step can be implemented by switching processes.

Having considered various embodiments described above, consider now an implementation example in accordance with one or more embodiments.

Implementation Example

Figure 8:
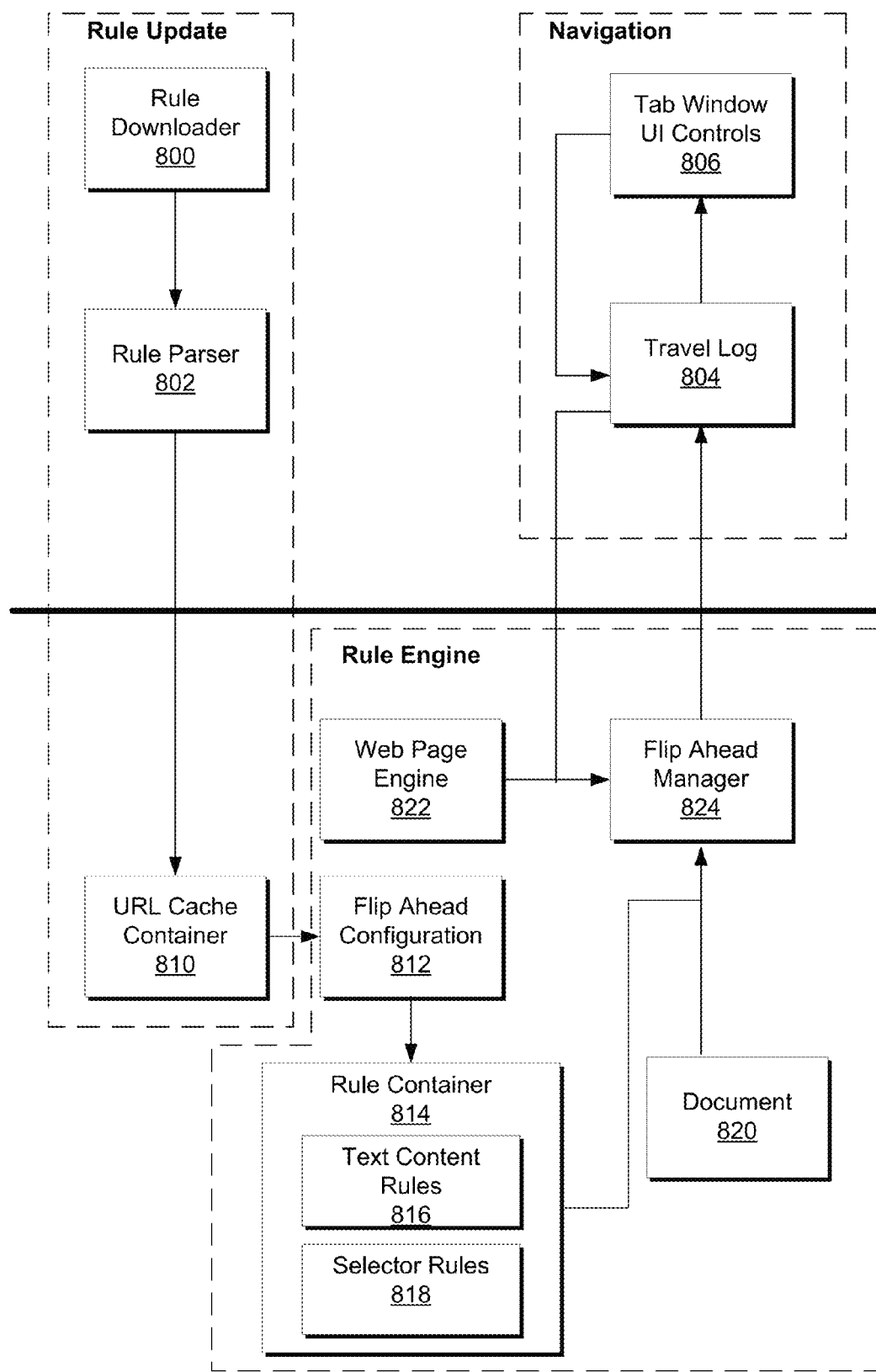
FIG. 8 illustrates a system in an implementation example in accordance with one or more embodiments.

FIG. 8 illustrates a system that describes an implementation example in accordance with one or more embodiments.

In this example, the system includes a rule downloader 800, rule parser 802, travel log 804, and tab window UI controls 806. The system also includes a URL cache container 810, a flip ahead configuration component 812, a rule container 814 that, in turn, includes text content rules 816 and selector rules 818. The system also includes a document 820, a webpage engine 822, and a flip ahead manager 824.

Collectively, rule downloader 800, rule parser 802, and URL cache container 810 constitute a rule update module. Travel log 804 and tab window UI controls 806 constituted a navigation module. Flip ahead configuration component 812, rule container 814, document 820, webpage engine 822, and flip ahead manager 824 constitute a rule engine.

In the illustrated and described embodiment, rule downloader 800 is a separate process that periodically checks, at regular intervals, the version of the rules (e.g., rule file) that exist on the client side and makes calls to a service endpoint ascertain if there is a rule file that is more recent than the rule file currently at the client device. If there is, rule downloader 800 downloads the rule file which, in at least some embodiments, comprises an XML file. The rule file is handed, by the rule downloader 800, to rule parser 802 which then parses the XML file into rules for each domain (i.e. specific rules) and general rules as described above. The rules are then inserted into the URL cache container 810. The URL cache container 810 is implemented as a fast look-up database.

The flip ahead configuration component 812 enables application of configuration information to modify how rules are applied. For example, the flip ahead configuration component 812 may specify the general rules are to take precedent over domain-specific rules. Conversely, the flip ahead configuration component 812 may specify that the domain specific rules are to take precedent over general rules.

When a webpage is navigated to by web browser, the flip ahead configuration component 812 builds rule container 814 to include text content rules 816 (i.e. general rules) and selector rules 818 (i.e. domain-specific rules) for a given webpage.

The flip ahead manager 824 interacts with the webpage engine 822 and the webpage engine's parsing of the webpage to determine if there is a rule in rule container 814 that matches on a given webpage, here represented by document 820. If there is a rule that constitutes a match, and there is no content in a user's forward navigation history (indicating that the currently consumed content was not navigated to by a backward navigation), the flip ahead manager 824 inserts a "flip ahead page" corresponding to the rule match in travel log 804. This enables forward navigation to the "flip ahead page" when a flip ahead input is received.

Tab window UI controls 806 enable a visual cue to be presented in the web browser to indicate that content has been inserted into the forward history. This notifies the user that content is available for a flip ahead input.

Having considered an implementation example, consider now an example device that can be utilized to implement the embodiments described above.

Example Device

Figure 9:
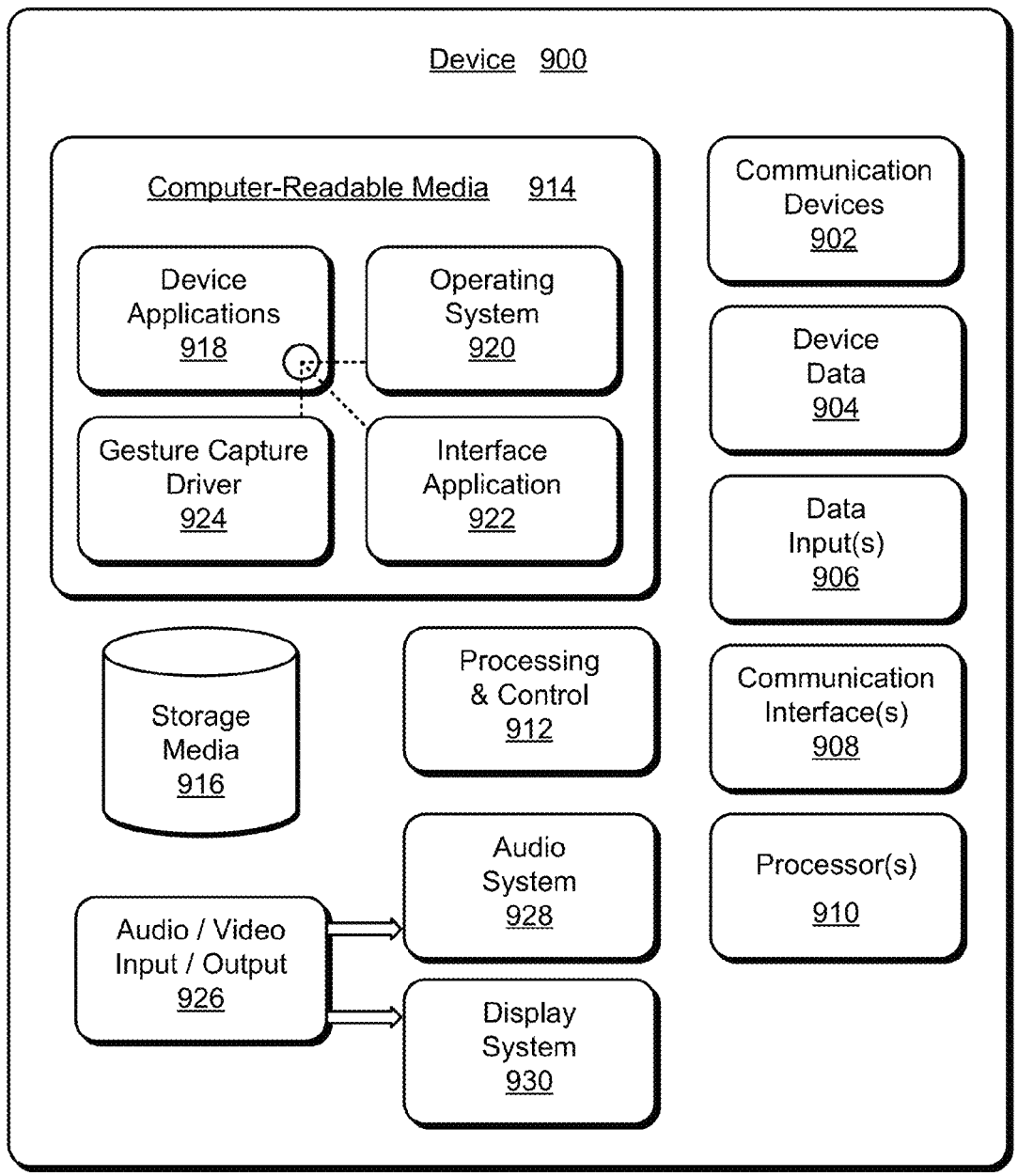
FIG. 9 illustrates an example computing device that can be utilized to implement various embodiments described herein.

FIG. 9 illustrates various components of an example device 900 that can be implemented as any type of portable and/or computer device as described with reference to FIGS. 1 and 2 to implement the embodiments described herein. Device 900 includes communication devices 902 that enable wired and/or wireless communication of device data 904 (e.g., received data, data that is being received, data scheduled for broadcast, data packets of the data, etc.). The device data 904 or other device content can include configuration settings of the device, media content stored on the device, and/or information associated with a user of the device. Media content stored on device 900 can include any type of audio, video, and/or image data. Device 900 includes one or more data inputs 906 via which any type of data, media content, and/or inputs can be received, such as user-selectable inputs, messages, music, television media content, recorded video content, and any other type of audio, video, and/or image data received from any content and/or data source.

Device 900 also includes communication interfaces 908 that can be implemented as any one or more of a serial and/or parallel interface, a wireless interface, any type of network interface, a modem, and as any other type of communication interface. The communication interfaces 908 provide a connection and/or communication links between device 900 and a communication network by which other electronic, computing, and communication devices communicate data with device 900.

Device 900 includes one or more processors 910 (e.g., any of microprocessors, controllers, and the like) which process various computer-executable or readable instructions to control the operation of device 900 and to implement the gesture embodiments described above. Alternatively or in addition, device 900 can be implemented with any one or combination of hardware, firmware, or fixed logic circuitry that is implemented in connection with processing and control circuits which are generally identified at 912. Although not shown, device 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 900 also includes computer-readable media 914, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 900 can also include a mass storage media device 916.

Computer-readable media 914 provides data storage mechanisms to store the device data 904, as well as various device applications 918 and any other types of information and/or data related to operational aspects of device 900. For example, an operating system 920 can be maintained as a computer application with the computer-readable media 914 and executed on processors 910. The device applications 918 can include a device manager (e.g., a control application, software application, signal processing and control module, code that is native to a particular device, a hardware abstraction layer for a particular device, etc.). The device applications 918 also include any system components or modules to implement embodiments of the gesture techniques described herein. In this example, the device applications 918 include an interface application 922 and a gesture-capture driver 924 that are shown as software modules and/or computer applications. The gesture-capture driver 924 is representative of software that is used to provide an interface with a device configured to capture a gesture, such as a touchscreen, track pad, camera, and so on. Alternatively or in addition, the interface application 922 and the gesture-capture driver 924 can be implemented as hardware, software, firmware, or any combination thereof.

Device 900 also includes an audio and/or video input-output system 926 that provides audio data to an audio system 928 and/or provides video data to a display system 930. The audio system 928 and/or the display system 930 can include any devices that process, display, and/or otherwise render audio, video, and image data. Video signals and audio signals can be communicated from device 900 to an audio device and/or to a display device via an RF (radio frequency) link, S-video link, composite video link, component video link, DVI (digital video interface), analog audio connection, or other similar communication link. In an embodiment, the audio system 928 and/or the display system 930 are implemented as external components to device 900. Alternatively, the audio system 928 and/or the display system 930 are implemented as integrated components of example device 900.

Conclusion

In one or more embodiments, a flip ahead input, such as a gesture, provides touch users with an ability to easily navigate various websites. The flip ahead input can be utilized to advance to the next portion of relevant content. In at least some embodiments, the flip ahead input resides in the form of a forward swipe.

In one or more embodiments, the flip ahead input is configured to be utilized in association with an aggregated browsing history from multiple users. The aggregated browsing history is analyzed to generate rules that are then downloaded to a client device and used by a suitably-configured web browser to ascertain the next portion of content when a flip ahead input is received.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method comprising:

analyzing browsing history information associated with multiple users;

using analyzed browsing history information to develop rules for exposing next content across multiple client devices, at least some of the rules defining recommended areas on a webpage, rather than recommended links, as next content, wherein the rules include:
general rules that are globally applicable across multiple domains; and
specific rules that are domain specific; and
providing developed rules to the multiple client devices, the developed rules being configured to be applied in an ordered manner in which:
website owner-specified rules, if any, are first applied;
the specific rules, if there are no website owner-specified rules, are next applied; and
the general rules, if there are no specific rules and no owner-specified rules, are next applied.

2. The method of claim 1, wherein said analyzing comprises building heat maps associated with content to which users have browsed.

3. The method of claim 1, wherein at least some of the rules define associations between DOM elements that appear on a webpage.

4. The method of claim 3, wherein said analyzing comprises building heat maps associated with content to which users have browsed.

5. The method of claim 1 further comprising enabling users to opt into browsing history collection.

6. The method of claim 1 further comprising updating the rules and providing updated rules to the multiple clients.

7. One or more computer-readable storage media storing instructions which, when executed, perform operations comprising:
analyzing browsing history information associated with multiple users;
using analyzed browsing history information to develop rules for exposing next content across multiple client devices, at least some of the rules defining recommended areas on a webpage, rather than recommended links, as next content, wherein the rules include:
general rules that are globally applicable across multiple domains; and
specific rules that are domain specific; and
providing developed rules to the multiple client devices, the developed rules being configured to be applied in an ordered manner in which:
website owner-specified rules, if any, are first applied;
the specific rules, if there are no website owner-specified rules, are next applied; and
the general rules, if there are no specific rules and no owner-specified rules, are next applied.

8. The one or more computer-readable storage media of claim 7, wherein said analyzing comprises building heat maps associated with content to which users have browsed.

9. The one or more computer-readable storage media of claim 7, wherein at least some of the rules define associations between DOM elements that appear on a webpage.

10. The one or more computer-readable storage media of claim 7 further comprising enabling users to opt into browsing history collection.

11. The one or more computer-readable storage media of claim 10, wherein said analyzing comprises building heat maps associated with content to which users have browsed.

12. The one or more computer-readable storage media of claim 7 further comprising updating the rules and providing updated rules to the multiple clients.

13. A computing device comprising:
one or more processors;
one or more computer-readable storage media storing instructions which, when executed by the one or more processors, perform operations comprising:
analyzing browsing history information associated with multiple users;
using analyzed browsing history information to develop rules for exposing next content across multiple client devices, at least some of the rules defining recommended areas on a webpage, rather than recommended links, as next content, wherein the rules include:
general rules that are globally applicable across multiple domains; and
specific rules that are domain specific; and
providing developed rules to the multiple client devices, the developed rules being configured to be applied in an ordered manner in which:
website owner-specified rules, if any, are first applied;
the specific rules, if there are no website owner-specified rules, are next applied; and
the general rules, if there are no specific rules and no owner-specified rules, are next applied.

14. The computing device of claim 13, wherein said analyzing comprises building heat maps associated with content to which users have browsed.

15. The computing device of claim 13, wherein at least some of the rules define associations between DOM elements that appear on a webpage.

16. The computing device of claim 13 further comprising enabling users to opt into browsing history collection.

17. The computing device of claim 16, wherein said analyzing comprises building heat maps associated with content to which users have browsed.

18. The computing device of claim 13 further comprising updating the rules and providing updated rules to the multiple clients.

* * * * *